US009660951B1

(12) United States Patent
Tunguz-Zawislak

(10) Patent No.: US 9,660,951 B1
(45) Date of Patent: *May 23, 2017

(54) CONTENT SHARING BASED ON SOCIAL GRAPHING

(71) Applicant: Google Inc., Mountain View, CA (US)

(72) Inventor: Tomasz J. Tunguz-Zawislak, San Francisco, CA (US)

(73) Assignee: Google Inc., Mountain View, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/584,529

(22) Filed: Dec. 29, 2014

Related U.S. Application Data

(63) Continuation of application No. 11/935,791, filed on Nov. 6, 2007, now Pat. No. 8,924,465.

(51) Int. Cl.
G06F 15/16 (2006.01)
H04L 12/58 (2006.01)
H04L 29/08 (2006.01)

(52) U.S. Cl.
CPC ............. H04L 51/32 (2013.01); H04L 67/12 (2013.01)

(58) Field of Classification Search
CPC ................................. H04L 51/32; H04L 67/12
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II et al. |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,285,999 B1 | 9/2001 | Page |
| 6,401,075 B1 | 6/2002 | Mason et al. |
| 6,577,716 B1 | 6/2003 | Minter et al. |
| 6,985,882 B1 | 1/2006 | Del Sesto |
| 7,039,599 B2 | 5/2006 | Merriman |
| 7,120,668 B2 | 10/2006 | Manber et al. |
| 7,136,875 B2 | 11/2006 | Anderson et al. |
| 7,188,153 B2 | 3/2007 | Lunt et al. |
| 7,197,544 B2 | 3/2007 | Wang et al. |
| 7,310,516 B1 | 12/2007 | Vacanti et al. |
| 7,478,078 B2 | 1/2009 | Lunt et al. |
| 7,904,337 B2 | 3/2011 | Morsa |

(Continued)

FOREIGN PATENT DOCUMENTS

WO WO97/21183 6/1997

OTHER PUBLICATIONS

U.S. Appl. No. 60/522,718, Liew et al.

(Continued)

*Primary Examiner* — Moustafa M Meky

(74) *Attorney, Agent, or Firm* — Fish & Richardson P.C.

(57) ABSTRACT

The subject matter of this specification can be embodied in, among other things, a method that includes generating a data structure that links users based on social relationships and permits a first user to target content to other users that are linked to the first user via a social relationship.

21 Claims, 9 Drawing Sheets

(56) References Cited

U.S. PATENT DOCUMENTS

| | | | |
|---|---|---|---|
| 8,924,465 B1* | 12/2014 | Tunguz-Zawislak | H04N 21/00 709/203 |
| 2002/0023230 A1 | 2/2002 | Bolnick et al. | |
| 2002/0120506 A1 | 8/2002 | Hagen | |
| 2002/0123928 A1 | 9/2002 | Eldering et al. | |
| 2004/0059708 A1 | 3/2004 | Dean et al. | |
| 2004/0093327 A1 | 5/2004 | Anderson et al. | |
| 2004/0122803 A1 | 6/2004 | Dom et al. | |
| 2004/0143841 A1 | 7/2004 | Wang et al. | |
| 2004/0148275 A1 | 7/2004 | Achlioptas | |
| 2004/0215793 A1 | 10/2004 | Ryan et al. | |
| 2005/0091202 A1 | 4/2005 | Thomas | |
| 2005/0144065 A1 | 6/2005 | Calabria et al. | |
| 2005/0149395 A1 | 7/2005 | Henkin et al. | |
| 2005/0159970 A1 | 7/2005 | Buyukkokten et al. | |
| 2005/0171799 A1 | 8/2005 | Hull et al. | |
| 2005/0171832 A1 | 8/2005 | Hull et al. | |
| 2005/0177385 A1 | 8/2005 | Hull et al. | |
| 2005/0216300 A1 | 9/2005 | Appleman et al. | |
| 2005/0235062 A1 | 10/2005 | Lunt et al. | |
| 2005/0278443 A1 | 12/2005 | Winner et al. | |
| 2005/0289113 A1 | 12/2005 | Bookstaff | |
| 2006/0004914 A1 | 1/2006 | Kelly et al. | |
| 2006/0015904 A1 | 1/2006 | Marcus | |
| 2006/0026013 A1 | 2/2006 | Kraft | |
| 2006/0031121 A1 | 2/2006 | Speicher | |
| 2006/0041543 A1 | 2/2006 | Achlioptas | |
| 2006/0080613 A1 | 4/2006 | Savant | |
| 2006/0085253 A1 | 4/2006 | Mengerink et al. | |
| 2006/0135264 A1 | 6/2006 | Shaw et al. | |
| 2006/0200435 A1 | 9/2006 | Flinn et al. | |
| 2006/0218577 A1 | 9/2006 | Goodman et al. | |
| 2006/0271460 A1 | 11/2006 | Hanif | |
| 2007/0043688 A1 | 2/2007 | Kountz et al. | |
| 2007/0061195 A1 | 3/2007 | Liu et al. | |
| 2007/0121843 A1 | 5/2007 | Atazky et al. | |
| 2007/0136136 A1 | 6/2007 | Nossik | |
| 2007/0143376 A1 | 6/2007 | McIntosh | |
| 2007/0150537 A1 | 6/2007 | Graham | |
| 2007/0156636 A1 | 7/2007 | Norton et al. | |
| 2007/0157119 A1 | 7/2007 | Bishop | |
| 2007/0198510 A1 | 8/2007 | Ebanks | |
| 2007/0214121 A1 | 9/2007 | Ebanks | |
| 2007/0233857 A1 | 10/2007 | Cheng et al. | |
| 2007/0234213 A1 | 10/2007 | Krikorian et al. | |
| 2007/0250483 A1 | 10/2007 | Blue et al. | |
| 2008/0005072 A1 | 1/2008 | Meek et al. | |
| 2008/0005073 A1 | 1/2008 | Meek et al. | |
| 2008/0005282 A1 | 1/2008 | Gaedcke | |
| 2008/0052742 A1 | 2/2008 | Kopf et al. | |
| 2008/0270551 A1 | 10/2008 | Flake et al. | |
| 2008/0301746 A1 | 12/2008 | Wiser et al. | |
| 2009/0106368 A1 | 4/2009 | Padveen et al. | |
| 2009/0131025 A1 | 5/2009 | Sharma et al. | |

OTHER PUBLICATIONS

"A Comparative Study on Feature selection and Classification methods Using Gene Expression Profiles and Proteomic Patterns" by Liu et al., for Genome Informatics 13: pp. 51-60, 2002.
AdForce, Inc., A Complete Guide to AdForce, Version 2.6, 1998, 285 pages.
AdForce, Inc., S-1/A SEC Filing, May 6, 1999, 9 pages.
AdKnowledge Campaign Manager: Reviewer's Guide, AdKnowledge, Aug. 1998, 23 pages.
AdKnowledge Market Match Planner: Reviewer's Guide, AdKnowledge, May 1998, 26 pages.
Ad-Star.com website archive from www. Archive.org, Apr. 12, 1997 and Feb. 1, 1997, 43 pages.
Baluja et al., ideo suggestion and discover for YouTube: Taking random walks through the view graph:, in *Proc. 17<sup>th</sup> International World Wide Web Conference (WWW)*, 2008 to appear.
Baseview Products, Inc., AdManagerPro Administration Manual v. 2.0, Dec. 1998, 226 pages.
Baseview Products, Inc., ClassManagerPro Administration Manual v. 1.0.5, Feb. 1, 1997,157 pages.
Bay et al., "surf: Speeded up robust features", in *Proc. 9<sup>th</sup> International European Conference on Computer Vision (ECCV)*, pp. 404-417, 2006.
Belongie et al, "Shape matching and object recognition using shape contexts", *IEEE Transactions on Pattern Analysis and Machine Intelligence (TPAMI)*, vol. 24, No. 24, pp. 509-522, 2002.
Brin, et al. "The Anatomy of a Large-Scale Hypertextual Web Search Engine" Computer Networks (1998) pp. 1-26.
Business Wire, "Global Network, Inc. Enters Into Agreement in Principle With Major Advertising Agency," Oct. 4, 1999, 2 pages.
Carson et al., "Blob-world: image segmentation using expectation-maximization and its application to image querying", *IEEE transactions on Pattern Analysis and Machine Intelligence (TPAMI)*, vol. 24, No. 8, pp. 1026-1038, 2002.
Chakrabarti, et al. "Mining the Web's Link Structure" IEEE Computer Magazine (Aug. 1999) pp. 60-67.
Chinese Examiners Huansheng Zhang and Xiang An, "Notification of First Office Action" dated Feb. 16, 2011 w/English Translation, 26 pages.
Chinese Examiners Huansheng Zhang and Xiang An, "Notification of Second Office Action" dated Mar. 30, 2012, 166 pages.
D.G. Lowe, "Distinctive Image Features from Scale-Invariant Keypoints", *International Journal of Computer Vision (IJCV)*, vol. 60, No. 2, pp. 91-110, 2004.
Datar et al., Locality-sensitive hashing scheme based on p-stable distributions:, in *Proc. 20<sup>th</sup> Symposium on Computational Geometry (SCG)*, pp. 253-262, 2004.
Dedrick, R., A Consumption Model for Targeted Electronic Advertising, Intel Architecture Labs, IEEE, 1995, 9 pages.
Dedrick, R., Interactive Electronic Advertising, IEEE, 1994, 12 pages.
Facebook unveils school-specific advertisements' [online]. The Stanford Daily, 2005, [retrieved on Jun. 14, 2006]. Retrieved from the Internet: <URL: www.daily.stanford.edu/tempo?page=content &id=15553&repository=0001_article>,2 pages.
Fergus et al., "A visual category filter for Google images," in *Proc. 8<sup>th</sup> European Conference on Computer Vision (ECCV)*, pp. 242-256, 2004.
Fergus et al., "Object class recognition by unsupervised scale-invarint learning" in *Proc. Conference on Computer Vision and Pattern Recognition (CVPR)*, vol. 2, pp. 264-271, 2003.
Frey et al., "clustering by passing messages between data points", *Science*, vol. 315, pp. 972-976, 2007.
Friedman et al., Bayesian network classifiers *Machine Learning*, vol. 29, pp. 131-163, 1997.
Frome et al., "Learning globally-consistent local distance functions for shape-based image retrieval and classification", in *Proc. 11<sup>th</sup> IEEE International Conference on Computer Vision (ICCV)*, pp. 1-8, 2007.
Harris et al., "A combine corner and edge detector", in *Proc. 4<sup>th</sup> Alvey Vision Conference*, pp. 147-151, 1988.
Haveliwala, et al. "Topic-Sensitive Page Rank" IEEE Transactions on Knowledge and Data Engineering (2003) 10 pages.
He et al., "Imagerank: spectral techniques for structural analysis of image database", in *Proc. International Conference on Multimedia and Expo*, vol. 1, 2002, 6 pages.
Herlocker, et al. "Evaluating Collaborative Filtering Recommender Systems" ACM Transactions on Information Systems, vol. 22, No. 1, Jan. 2004, pp. 5-53.
Hsu et al., "Video search reranking through random walk over document-level context graph" in *Proc. 15<sup>th</sup> International Conference on Multimedia*, pp. 971-980, 2007.
Indyk et al., "Approximate nearest neighbor-towards removing the curse of dimensionality", in *Proc. 30<sup>th</sup> ACM Symp. On Computational Theory*, pp. 604-613, 1998.
Information Access Technologies, Inc., Aaddzz brochure, "The Best Way to Buy and Sell Web Advertising Space," © 1997, 6 pages.

(56) References Cited

OTHER PUBLICATIONS

Information Access Technologies, Inc., Aaddzz.com website archive from www. Archive.org, archived on Jan. 30, 1998, 42 pages.
J.M. Kleinberg, "Authoritative sources in a hyperlinked environment", *Journal of the ACM*, vol. 46, No. 5, 1999, 34 pages.
Jing et al., "Canonical image selection from the web", in *Proc. 6th International Conference on Image and Video Retrieval (CIVR)*, pp. 280-287, 2007.
Jing et al., "VisualRank: Applying PageRank to Large-Scale Image Search," 14 pages.
Joshi et al., "The story picturing engine—a system for automatic text illustration", *ACM Transactions on Multimedia, Computing, Communications and Applications*, vol. 2, No. 1, pp. 68-89, 2006.
Ke et al., "Efficient near-duplicate detection and sub-image retrieval", in *Proc. ACM International Conference on Multimedia (ACM MM)*, pp. 869-876, 2004.
Ke et al., "Pca-sift: A more distinctive representation for local image descriptors", in *Proc. Conference on Computer Vision and Pattern Recognition (DVPR)*, vol. 2, pp. 506-516, 2004.
Kleinberg, et al. "The Web as a graph: measurements, models, and methods" Proceedings of the International Conference on Combinatorics (1999) 18 pages.
Kondor et al., "Diffusion kernels on graphs and other discrete structures", in *Proc. 19th International Conference on Machine Learning (ICML)*, pp. 315-322, 2002.
Konstan, et al. "Applying Collaborative Filtering to Usenet News" Communications of the ACM, Mar. 1997, vol. 40, No. 3, pp. 77-87.
Lazebnik et al., Á sparse texture representation using affine-invariant regions, in *Proc. Conference on Computer Vision and Pattern Recognition (CVPR)*, vol. 2, pp. 319-324, 2003.
Ma et al., "A toolbox for navigating large image databases", *Multimedia System*, vol. 3, No. 7, pp. 568-571, 1999.
Mikolajczyk et al., "A performance evaluation of local descriptors", *IEEE Transactions on Pattern Analysis and Machine Intelligence (TPAMI)*, vol. 27, No. 10, pp. 1615-1630, 2005.
Nister et al., "Scalable recognition with a vocabulary tree", in *Proc. Conference on Computer vision and Pattern Recognition (CVPR)*, vol. 2, pp. 2161-2168, 2006.
Nowak et al., "Learning visual similarity measures for comparing never seen objects", in *Proc. Conference on Computer Vision and Pattern Recognition (CVPR)*, 2007, 8 pages.
P. Indyk, "Stable distributions, pseudorandom generators, embeddings, and data stream computation", in *Proc. 41st IEEE Symposium on Foundations of Computer Science (FOCS)*, 2000, 17 pages.
Park et al., "Majority based ranking approach in web image retrieval", *Lecture Notes in Computer Science*, vol. 27-28, pp. 499-504, 2003.
Pentland et al., "Content-based manipulation of image databases", *International Journal of Computer Vision (IJCV)*, vol. 18, No. 3, pp. 233-254, 1996.
Philbin et al., "Object retrieval with large vocabularies and fast spatial matching", in *Proc. Conference on Computer Vision and Pattern Recognition (CVPR)*, 2007, 8 pages.
Pilaszy "Text Categorization and Support Vector Machines" Computer Science, vol. 1398, (1998) 10 pages.
R. Datta et al., "Image retrieval: Ideas, influences, and trends of the new age", *ACM Computing Surveys*, vol. 40. No. 2, 2008, 60 pages.
Request for Reexamination of U.S. Pat. No. 6,446,045 B1, Control No. 95/001,061, 54 pages.
Request for Reexamination of U.S. Pat. No. 6,829,587 B2, Control No. 95/001,068, 85 pages.
Request for Reexamination of U.S. Pat. No. 7,240,025 B2, Control No. 95/001,073, 85 pages.
Request for Reexamination of U.S. Pat. No. 7,249,059 B2, Control No. 95/001,069, 81 pages.
Schindler et al., "City-scale location recognition", in Proc. Conference on Computer Vision and Pattern Recognition (CVPR), 2007, 7 pages.
Sebastiani "Machine Learning in Automated Text Categorization" ACM Computing Surveys, vol. 34, No. I, Mar. 2002, pp. 1-47.
Simon et al., "Scene summarization for online image collections", in *Proc. 12th International Conference on Computer Vision (ICCV)*, 2007, 8 pages.
Smeulders et al., "Content-based image retrieval at the end of the early years", *IEEE Transactions on Pattern Analysis and Machine Intelligence (TPAMI)*, vol. 22, No. 12, pp. 1349-1380, 2000.
Supplementary European Search Report for EP07812474 dated Apr. 28, 2011, 4 pages.
Uchihashi et al., "Content-free image retrieval by combinations of keywords and user feedbacks", in *Proc. 5th International Conference on Image and Video Retrieval (CIVR)*, pp. 650-659, 2005.
Weinberger et al., "Distance metric learning for large margin nearest neighbor classification", in *Proc. 18th Conference on Advances in Neural Information Processing Systems (NIPS)*, vol. 18, pp. 1437-1480, 2006.
Winder et al., "Learning local image descriptors", in *Prof. Conference on Computer Vision and Pattern Recognition (CVPR)*, 2007, 8 pages.
Xing et al., "Distance metric learning, with applications to clustering with side-information", in *Proc. 15th Conference on Advances in Neural Information Processing Systems (NIPS)*, vol. 15, pp. 450-459, 2002.
Zeff, R. et al., Advertising on the Internet, 2nd Ed., John Wiley & Sons, 1999, 440 pages.
Office Action issued in Indian Application No. 222/MUMNP/2009 on Feb. 24, 2015, 2 pages.

\* cited by examiner

US 9,660,951 B1

CONTENT SHARING BASED ON SOCIAL GRAPHING

CROSS-REFERENCE TO RELATED APPLICATIONS

This application is a continuation application of and claims priority to U.S. application Ser. No. 11/935,791, filed on Nov. 6, 2007, the entire contents of which are hereby incorporated by reference.

TECHNICAL FIELD

This instant specification relates to sharing content based on a social relationships between a first user and other user.

BACKGROUND

As the Internet has become increasingly popular, online social networks are becoming an important and pervasive mechanism for communication, entertainment, and profession and social networking. Some online social networks use digital advertisements to meet or defray the costs of hosting. Some of the advertisements, however, are directed to products, which may not be of interest to many people using an online social network for the purposes described above.

Also, the ability of social network members to highlight themselves or their messages may be limited to sending out messages to a large group of members that may or may not be interested in the messages.

SUMMARY

In general, this document describes generating a data structure that links users based on social relationships and permits a first user to target content to other users that are linked to the first user via a social relationship.

In a first general aspect, a computer-implemented method is described. The method includes determining acquaintance relationships among a group of people. The determination of the acquaintance relationships is based on a plurality of electronic documents associated with members of the group.

The method also includes generating a data structure that links the members of the group to each other based on the determined acquaintance relationships and receiving a request to distribute content from a first member of the group to one or more acquaintances of the first member that are unspecified in the received request. The method includes identifying the one or more unspecified acquaintances by selecting one or more second members that are linked in the data structure to the first member based on an acquaintance relationship and transmitting the content to the one or more second members.

In a second general aspect, a computer implemented method is described that includes deriving relationships between a group of users based on a plurality of electronic documents that are associated with the users, generating a graph having nodes that each represent a user and having edges that link the nodes based on the derived relationships. The method includes receiving a request to distribute content from a first user of the group to one or more second users of the group that have a relationship to the first user. The one or more second users are unspecified in the received request.

The method also includes identifying the one or more unspecified second users by selecting one or more nodes in the generated graph that neighbor a node representing the first user, and transmitting the content to the identified one or more second users represented by the neighboring nodes.

In another general aspect, a system is described. The system includes means for determining acquaintance relationships among a group of people based on a plurality of electronic documents associated with members of the group and generating a data structure that links the members of the group to each other based on the determined acquaintance relationships.

The system also includes an interface to receive a request to distribute content from a first member of the group to one or more acquaintances of the first member that are unspecified in the received request and a content server to identify the one or more unspecified acquaintances as one or more second members that are linked in the data structure to the first member based on an acquaintance relationship and to transmit the content to the one or more second members.

The systems and techniques described here may provide one or more of the following advantages. First, a convenient way to target a user's friends for announcements or advertisements is provided. Second, an efficient method and system to advertise local products or services to an appropriate audience is provided. Third, a method and system is provided that facilitates product and service referrals and trusted promotions of the same. Fourth, the effectiveness of advertising and announcements are increased by targeting an audience that is customized to a publisher of the advertisement or announcement.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for sharing content among users based on social relationships. In some implementations, information from social networks, email servers, or publicly available information can be used to derive social relationships between users. For example, profiles hosted on social networks can be used to identify social networking users that list each other as friend on the profiles. Once relationships between users are derived, a first user can target content such as announcements or advertisements to other users that have a social relationship with the first user. The first user does not have to explicitly specify the other users; instead, appropriate users are selected based on the relationships derived from information such as the profiles hosted by the social network.

Figure 1A:
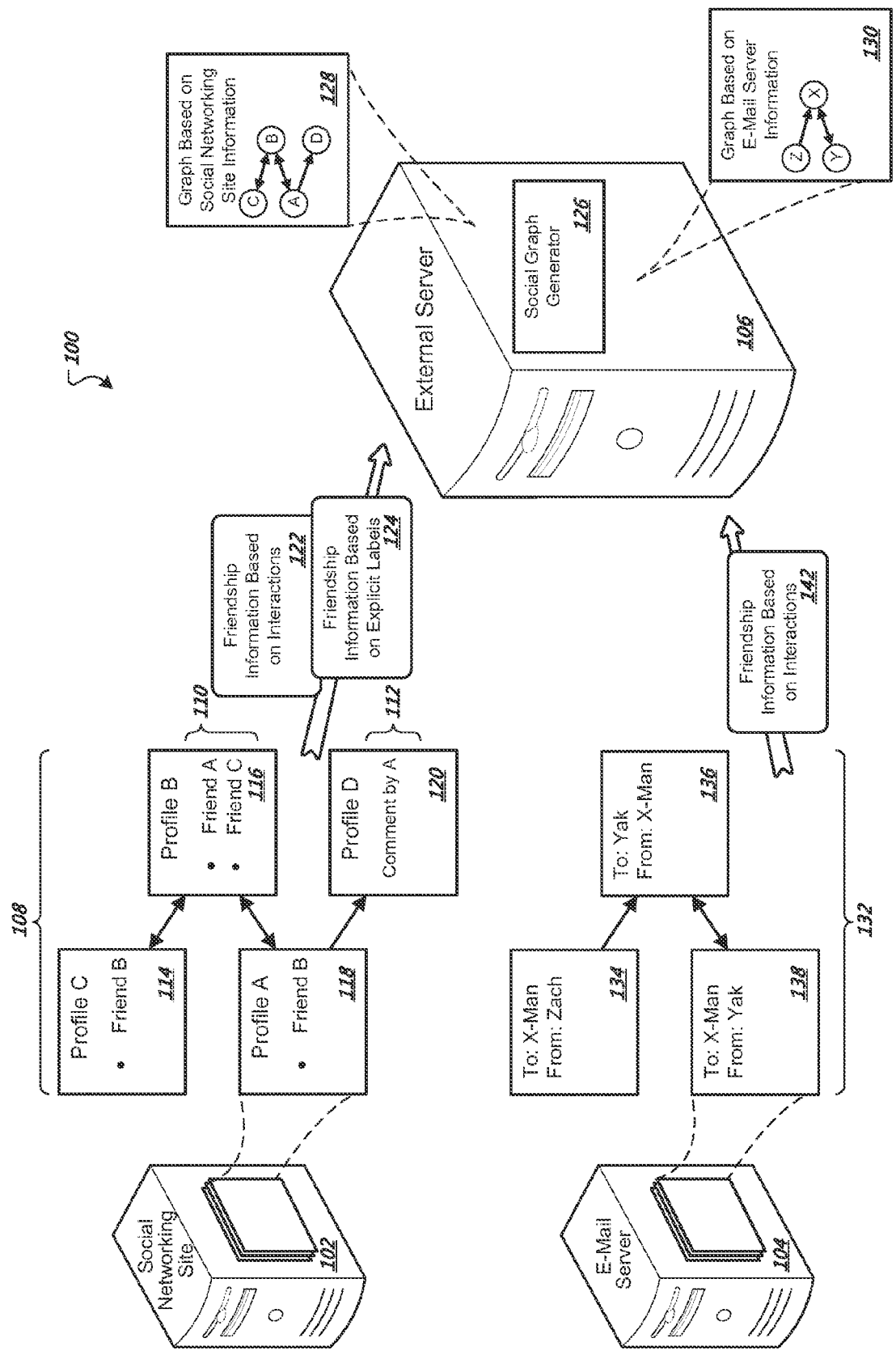
FIGS. 1A and 1B are schematic diagrams that respectively show exemplary systems for generating social graphs and using the social graphs to distribute content from a user to the user's social acquaintances, or friends.
Figure 1B:
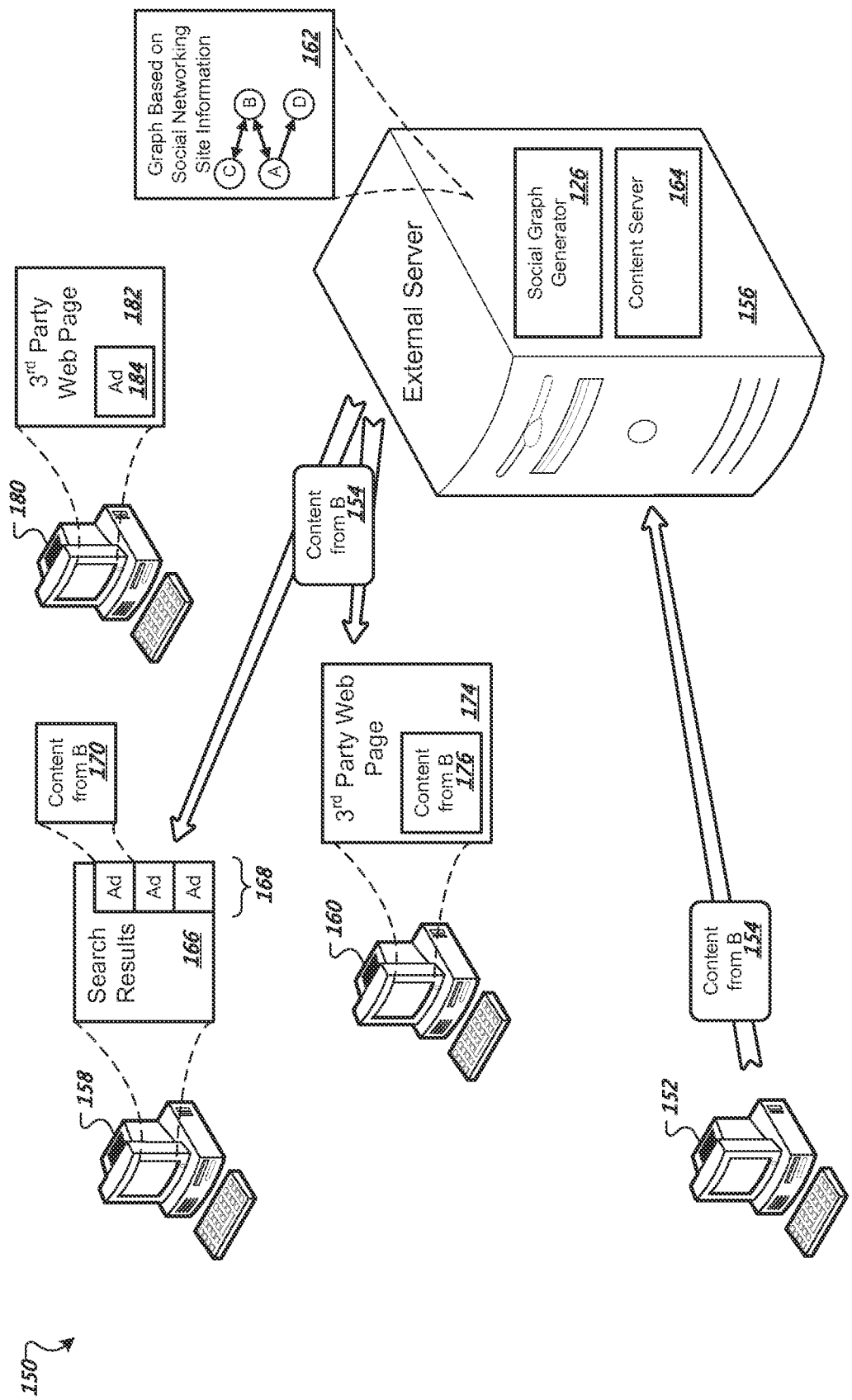

FIGS. 1A and 1B are schematic diagrams that respectively show exemplary systems for generating social graphs and using the social graphs to distribute content from a user to the user's social acquaintances, or friends. FIG. 1A is a schematic diagram showing an exemplary system 100 for generating the social graph. The system 100 includes a social networking site 102 and an e-mail server 104, both of which can transmit information to an external server 106. The externals server 106 can use the information to derive social relationships between users of the social networking site 102 and users of the e-mail server 104.

The information transmitted from the social networking site 102 can include profile information 108. The profile information can be based upon profiles such as profiles A-D hosted by the social networking site 102. The profiles can include information about social relationships (e.g., friendships) between users of the social network site 102. For example, a user's profile may list other users of the social network site 102 as friends using friendship labels, or designators 110. The profiles also can include comments that were made by users of the social network site 102. For example, user D's profile 120 includes comments 112 authored by user A and posted on user D's profile.

Arrows between the profiles shown in FIG. 1A indicate relationships between the social network users. For example, the profile C 114 is linked to the profile B 116 because the profile C includes a friendship designator, which indicates that B is a friend. The profiled B, not only is linked to profile C 114 based on a friendship designator, but is also linked to the profile A based on a different friendship designator.

In the example of FIG. 1A, the profile A 118 is linked to both profile A and profile D. The profile A 118 is linked to the profile B 116 as a consequence of the friendship designator within the profile A 118. However, the profile A is linked to the profiled D 120 based on the comments 112 that the user A posted to the profile of user D. The profile D 120 does not originate a link to another profile, but instead only receives a link to the profile A 118 based on the comments 112. This is because the profile D does not list any friendship designators and the user associated with the profile D has not interacted with other users of the social network site 102 (e.g., posted comments to other profiles, viewed other profiles over a predetermined number of times, joined a group on the social networking site, etc.).

The profile information 108 can be directly transmitted to the external server 106, which can extract the relationship information described above or the relationship information can be extracted by the social network site 102 and transmitted to the external server as friendship information based on interactions 122 and friendship information based on explicit labels 124.

After receiving information from the social network site 102, the external server can generate a social graph 128 using a social graph generator 126. In certain implementations, each user of the social networking site having a profile is represented by a node within the social graph 128. The social graph generator 126 can link the nodes using edges, or connections, that are based on relationships derived from the information (e.g., electronic profile documents) transmitted by the social networking site 102. For example, as shown in FIG. 1 and, the bidirectional edges between nodes C and B reflect the bidirectional friendship labels present in the profiles for users C and B.

In a substantially similar manner, the e-mail server 104 can transmit information to the external server 104. The external server 104 derives a social graph such as the social graph 130. As shown in the FIG. 1A, the e-mail server 104 stores e-mail information 132. The e-mail information can include e-mails from or to users of the e-mail server 104. For example, an e-mail 134 is addressed to Yak and is from Zach. An e-mail 136 is to Yak from X-Man, and an e-mail 138 is to X-Man from Yak.

Arrows between the e-mails indicate a relationship between the senders and receivers. For example, the e-mail 134 has a unidirectional relationship with the e-mail 136 because Zach sent an email to Yak, yet Zach has not received an e-mail back from Yak. In contrast, the e-mails 136 and 138 have a bidirectional relationship because Yak and X-Man have both sent each other e-mails. External server 106 can use the social graph generator 126 to extract the relationship information directly from the electronic documents stored on the e-mail server 144 or can receive pre-extracted information from the e-mail server 104 as indicated by the transmission of friendship information based on interaction of users 142.

After receiving the information from the e-mail server 104, the social graph generator 126 can generate the social graph 130 in a substantially similar manner as the social graph 128 was generated.

Although, FIG. 1A shows the external server 106 receiving information from a social networking site and an email server, relationship information can be derived from other sources that store information about users or interactions between users such instant messaging servers, VoIP servers, etc. For example, if a user of the other sources chooses to opt-in to share the user's communications and stored information, the information can be transmitted to the external server 106, which derives the relationship information from the information.

Additionally, in some implementations, portions or entire social graphs generated from different sources can be combined. For example, if a user has a single identifier for both a social network site and an e-mail server, the graphs can be combined by representing the user as a single node that joins both graphs. In some implementations, the user can also be identified across different source systems (e.g., social network sites, email servers, etc.) using cookies or other identifiers. For example, a user can opt-in to share his or her identity across the different source systems. The identifiers for the user can then be linked or cross-indexed so that graphs resulting from the source systems can be combined.

FIG. 1B shows an exemplary system 150 for distributing content from a user to acquaintances of the user based on a derived social graph. The system includes a client 152 for a user B that transmits content 154 to an external server 156 for distribution to clients 158, 160. The distribution of user B's content is determined based on a social graph 162.

A user B at the client 152 selects or generates content to transmit to the external server 156. For example the user B can create an announcement for a party hosted by the user B. In another example, the user B can create an advertisement for a product or service that originates from the user B or originates with a third party (e.g., a HUFFY mountain bike, a coupon for a STARBUCKS' coffee, etc.). In yet another example, the user B can create an advertisement for his profile page in an attempt to get acquaintances to visit the profile page. The content 154 can include video, audio, images, or text.

In certain implementations, when the user B transmits the content 154, the user B also specifies that he or she wants to target his or her acquaintances but does not identify the acquaintances.

After receiving the content from user B 154, the external server 156 can use a social graph 162 to identify acquaintances of user B. As shown in the FIG. 1B, the user B is associated directly with a user A and a user C via a bidirectional edge, which indicates that users A and C are friends with user B as well as user B being friends with users A and C. The user D—as represented by a node D in the social graph 162—is not directly linked to a node representing user B. In this implementation, the user D is not specified as an acquaintance of the user B because user D is not directly linked to the user B.

In certain implementations, the external server 156 can identify users as acquaintances if they are within a predetermined number of links, or edges, from a node representing an originator of content to distribute. For example, the external server 156 can designate all users within three links of a content originator as acquaintances of the content originator. In the example of FIG. 1B, the threshold is a single link, so only users within one link of B are considered acquaintances of user B. Thus, the external server 156 does not identify user D as an acquaintance of user B.

After identifying the acquaintances of the user B, the content server 164 can transmit the content to user B's acquaintances. For example, the content 154 from user B is transmitted to the client 160 operated by user C and to the client 158 operated by user A.

In some implementations, transmission of the content 154 from user B to the clients 158, 160 is conditioned upon the respective clients accessing web pages that submit a request to the external server 156. For example, user A's client 158 can access a search engine to retrieve a web page 166 that displays search results. The web page 166 of search results can include advertisements or other information within a reserved space 168 of the web page 166. When the web page is accessed by the client 158, code (e.g., JavaScript code) within the web page 166 can request information (such as advertising or other content) from the external server 156 to fill the reserved space 168. The request for information to fill the reserve space 168 can include an identifier for the user A such as a cookie. When the external server receives the cookie from a client 158, the external server 156 can transmit the content 154 from user B so that the content 154 fills up an area 170 of the reserved space 168.

Similarly, user C can access a third party web page 174, which includes reserved space 176 that is used display advertising or other content from the external server 156. When user C's client 160 accesses the third party web page, code within the web page 174 can transmit a request including a cookie identifying the user C to the external server 156. In response, the external server 156 can transmit the content 154 from user B for display son the client 160.

Because the content server 164 did not identify user D 180 as an acquaintance of the user B, when the user D accesses a third-party web page 182 having reserved space 184, content 154 from user B is not transmitted for display to the user D. In certain implementations, other information is transmitted to the user D 180 for display in the reserved space 184 such as an advertisement from the external server 156.

Figure 2:
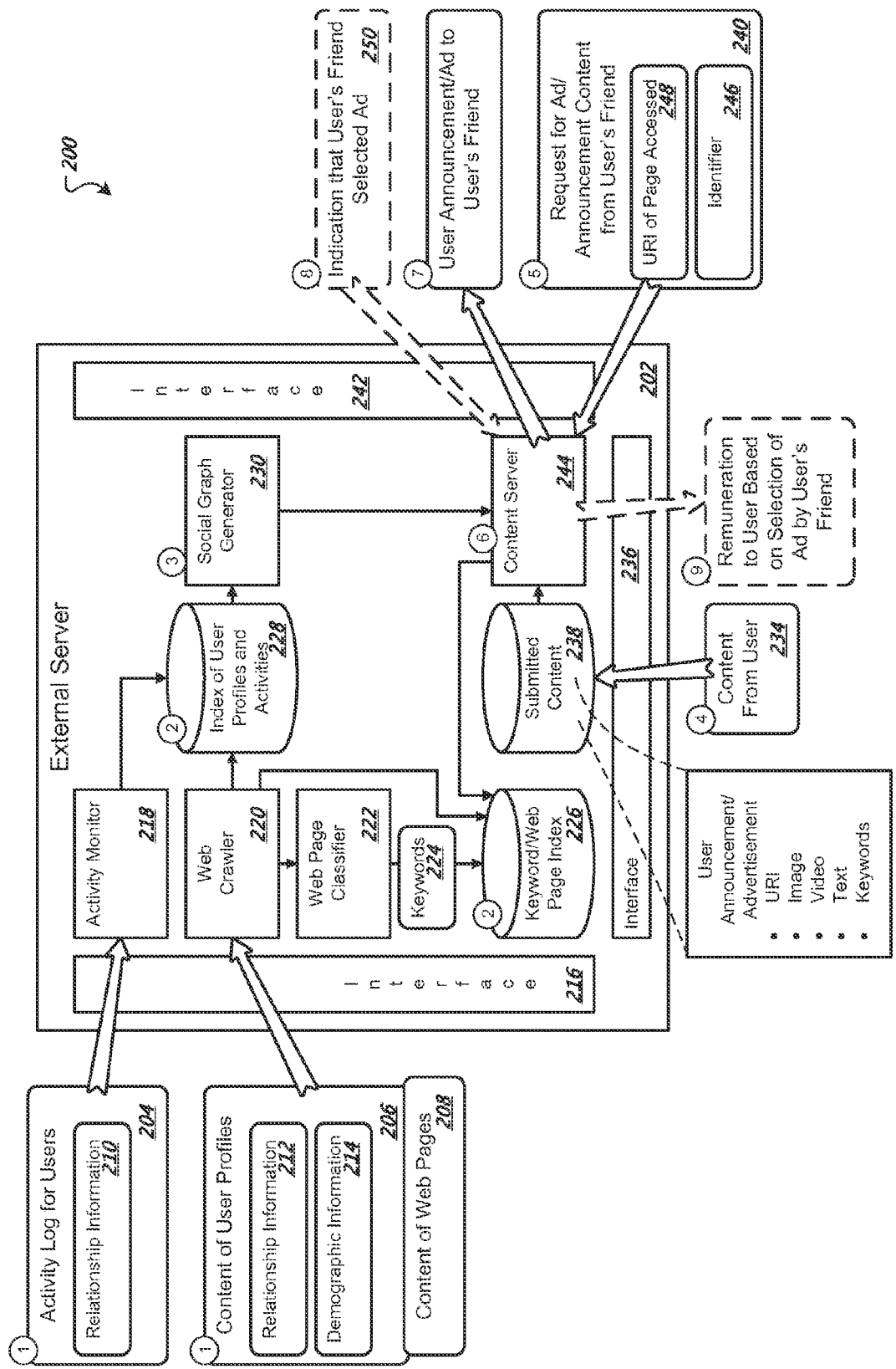
FIG. 2 is a box diagram of an exemplary system 200 for deriving a social graph based on electronic documents and using the social graph to target content to friends of a user that submitted the content.

FIG. 2 is a box diagram of an exemplary system 200 for deriving a social graph based on electronic documents and using the social graph to target content to friends of a user that submitted the content. The system 200 includes an external server 202 that receives electronic documents from source systems (not shown). The external server 202 generates a social graph based on the received electronic documents and uses the social graph to distribute content so that it is targeted to friends of a user that submitted the content.

Circled numbers shown in FIG. 2 indicate one example of a general order of order of actions that can occur within the system 200. The order is given for purposes of explanation and is not meant to be limiting. For example, all of the steps can occur simultaneously or in a different order than that indicated by the exemplary sequence.

Referring again to FIG. 2, in a first action, or step, the external server 202 can receive an activity log 204 for users (e.g., users of a social network site or an e-mail server). The external server 202 also can receive content of user profiles 206 and content of web pages 208 from source systems not shown.

In some implementations, the activity logs 204 for users can include information such as the senders and receivers of instant messages, e-mails, whether a user visited another user's web site (and how many times), whether a user posted comments to another user's website, etc. This information can be transmitted, for example, if a user actively opts in to share the information.

The activity log 204 for users also can include implicit or explicit relationship information 210. For example, relationship information can be derived from communications between two users as discussed in association with FIG. 1A. The content of user profiles 206 can include relationship information 212, such as explicit friendship labels included in the user profiles. The content of user profiles 206 also can include demographic information 214, such as an age, gender, interest, and location of users associated with the user profiles.

An interface 216 of the external server 202 can receive the activity log 204 for users and can transmit the log to an activity monitor 218. The content 206 of user profiles and the content 208 of web pages can be transmitted through the interface 216 to a web crawler 220 that is used to index web pages on the Internet.

In a second step, the web crawler 220 can transmit the content 248 of the web pages to a web page classifier 222, which extracts or determines keywords 224 based on the content 208 of the web pages. The keywords 224 and an identifier for a corresponding web page from which the keywords were derived can be indexed in a keywords/web page index 226. The keyword/web page index 226 can correlate keywords with particular web pages.

In parallel with the transmission of the web page content 208 to the web page classifier 222, the web crawler can transmit the content 206 of user profiles and the content 208 of web pages to an index 228 of user profiles and activities. Also in parallel, the activity monitor 218 can transmit the activity log 204 or information derived from it to the index 228 of user profiles and activities.

In a third step, the social graph generator 230 can use information stored in the index 228 of user profiles and activities to derive relationship information if it has not been previously derived. The social graph generator 230 can generate a social graph that links users based on the relationship information as previously described.

In a fourth step, the user can submit content 234 to the external server 202 through an interface 236. The external server 202 can store the content in the database 238 for submitted content. As shown in FIG. 2, the submitted content 234 can be an announcement or an advertisement from the user (also referred to as a content submitter). The content can include a uniform resource identifier (URI) to an electronic document such as a web page, an image, a video, text, or keywords that are used to associate the announcement or advertisement with other content being viewed by a target of the announcement or advertisement (e.g., content from a web page viewed by the target).

In the fifth step, the external server 202 can receive a request 240 from a friend or acquaintance of the content submitted for an ad or announcement via an interface 242. In a sixth step, the content server 244 can determine that the request is from a friend or acquaintance of the user that submitted the content. For example, the content server can compare an identifier 246 (e.g., cookie information) submitted with the request 240 for content to determine if the identifier specifies an acquaintance of the user that submitted the content.

This determination can be made by accessing a social graph created by the social graph generator 230. The request from the user's friend can also include a URI 248 of a web page (or other electronic content) accessed by the friend. For example, when the web page is accessed by a browser operated by the friend, code within the web page can generate the request 240 and include the URI 246 that specifies the accessed web page.

Optionally, the content server 244 can access the keyword/web page index 226 to determine keywords associated with the web page identified by the URI 248. The content server 244 can compare the keywords from the keyword/web page index to keywords the content submitter may have included with the content. If the keywords correspond to each other, this can indicate that the web page accessed by the friend has content that is related to the content 234 uploaded by the user for distribution. In some implementations, the content server 236 can use this comparison to determine whether to transmit the content to the friend. For example, the content server 244 may not transmit the content 234 uploaded by the user to the friend if the uploaded content 234 is not related to the web page accessed by the friend.

In other implementations, if the request 240 for an advertisement or announcement is from an acquaintance of the content submitter, the content server 244 transmits the content 234 from the content submitter to the acquaintance as indicated in step seven. In certain implementations, this transfer occurs regardless of whether the web page accessed by the acquaintance is related or not related to the uploaded content 234.

Optionally, in step eight, an indication 250 is transmitted back to the external server 202, where the indication 250 specifies that the acquaintance selected a URI embedded in the content 234. For example, the content submitter may have embedded a URI that specifies a web page for a third party product (e.g., a book from AMAZON.COM). If the friend selects the URI, the indication 250 of the selection is transmitted back to the external server 202.

In optional step nine, the external server 202 can transmit remuneration to the content submitter if the external server 202 received the indication 250 specifying that an acquaintance of the content submitter selected an ad within the content. For example, the remuneration can include financial payment, points that can be redeemed for prizes, an increase in a reputation ranking for the content submitter, etc.

Figure 3:
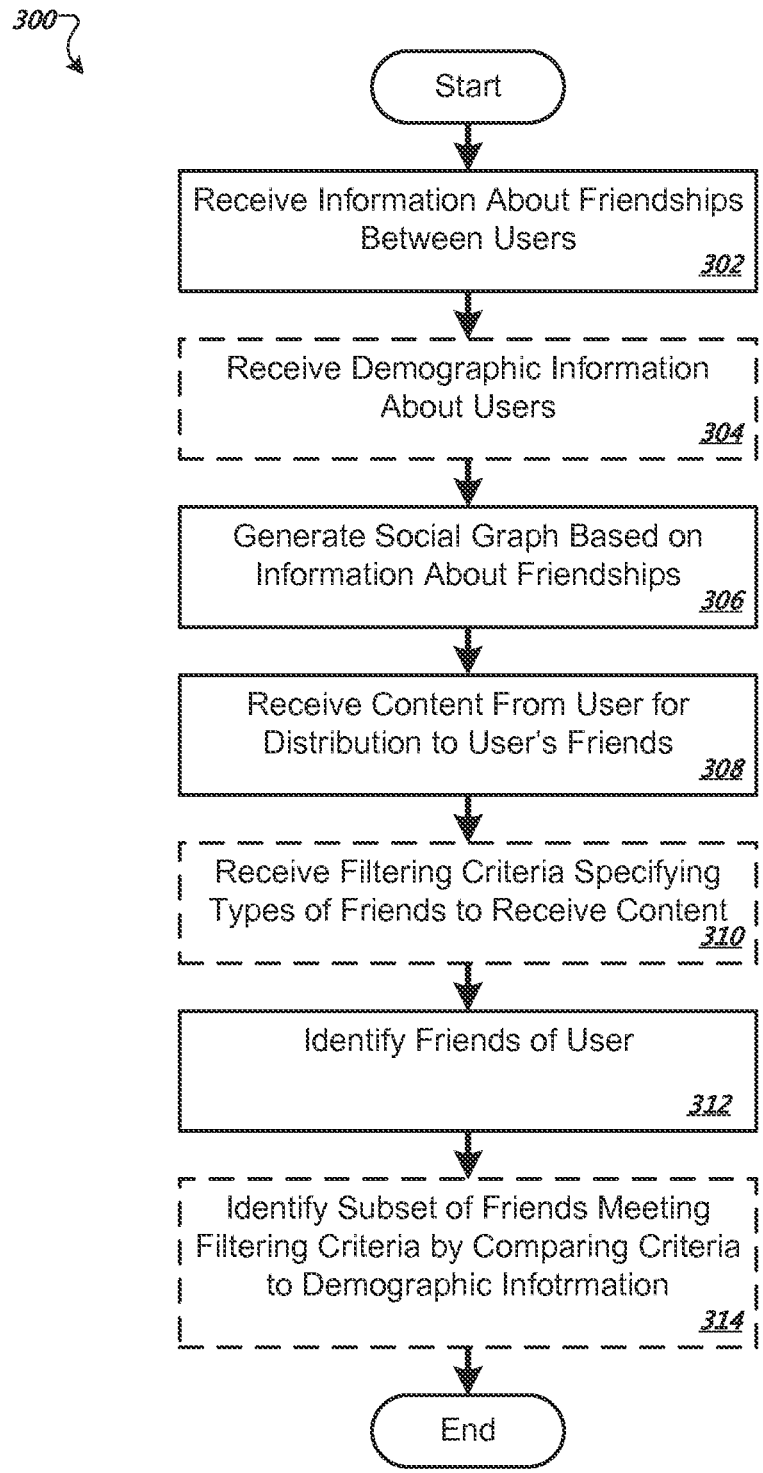
FIG. 3 is a flow chart of an exemplary method 300 for targeting content submitted by a user to friends of the user.

FIG. 3 is a flow chart of an exemplary method 300 for targeting content submitted by a user to friends of the user. The method 300 may be performed, for example, by a system such as the systems 100, 150 and 200 and, for clarity of presentation, the description that follows uses the system 200 as the basis of an example for describing the processes. However, another system, or combination of systems, may be used to perform the method 300.

In step 302, information is received about friendships between users. For example, the external server 202 can receive activity logs 204 and the content of user profiles 206 from a source system such as a social network site.

In optional step 364, demographic information about users is received. For example, the content of user profiles 206 transmitted to the external server 202 from the social network site can include demographic information about social network users. For example, a user may list on his profile that the user is interested in the Rolling Stones, that he is 47-years-old, and that he is a male.

In step 346, a social graph is generated based on information about relationships between users. For example, the social graph generator 230 can determine which users are friends based on explicit labels included in user profiles obtained from the social network site. In other implementations, the social graph generator 230 can derive relationships, or friendships, from communications between users such as when one user posts information to another user's profile hosted the social network site.

In step 308, content is received from a user for distribution to the user's friends. For example, a user can upload an announcement that the user is hosting a walk-a-thon to raise money for charity. The user can include a URI within the content that directs people who select the URI to the user's profile so that they can donate.

The user may desire that only acquaintances of the user receive this announcement. The interface 236 of the external server 202 can present the user with a list of possible recipients to receive the message. For example, the list of possible acquaintances can include all acquaintances, close friends, local acquaintances, age-similar acquaintances, acquaintances from school, and acquaintances interested in similar hobbies.

In optional step 310, filtering criteria is received that specifies types of friends to receive the content. For example, the user can select a type of acquaintance from the list of possible acquaintance presented by the user interface 236. If the user does not select the type, the external server 202 can select all acquaintances by default.

In step 312, the friends of the user are identified. For example, the content server 244 can access the social graph generated by the social graph generator 230. More specifically, the content server 244 can identify the user that submitted the content using a user identifier such as a cookie. The content server 244 can match the user identifier to an identifier for one of the nodes within the social graph and then can examine identifiers associated with neighboring nodes to determine friends of the user.

In optional step 314, a subset of friends that meet the filtering criteria is identified by comparing the filtering criteria with the demographic information. For example, if the user specified that he or she only wanted the content to be displayed to acquaintances from school, the content server can access demographic information associated with the identified friends to determine what schools the identified friends have previously or are currently attending (e.g., by examining e-mail addresses for information that identifies a school or by searching for keywords included in the identified friends' profile pages). The filtering criteria can then be matched against the information retrieved regarding the user's friends to determine which friends should receive the content. After this, the method 300 can end.

Figure 4:
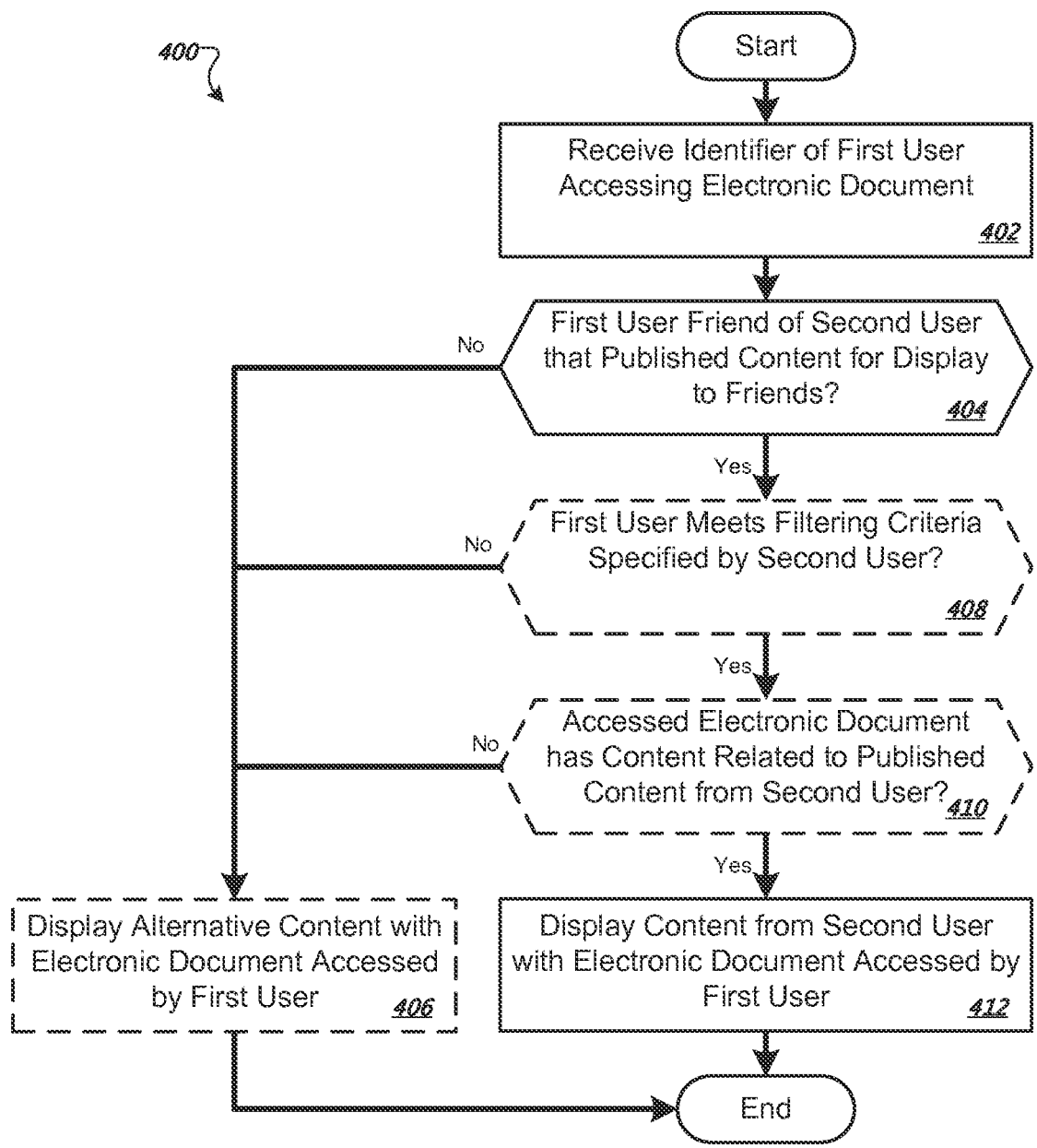
FIG. 4 is a flow chart of an exemplary method 400 for displaying content submitted by a user to a user's friends.

FIG. 4 is a flow chart of an exemplary method 400 for displaying content submitted by a user to a user's friends. For example, if a user's friend accesses a web page having a space for advertisements, the web page may issue a request to the external server 202. In response to the request, the external server 202 can transmit the content uploaded by the user so that it is displayed on the web page to the friend.

The method 400 may be performed, for example, by a system such as the systems 100, 150 and 200 and, for clarity of presentation, the description that follows uses the system 200 as the basis of an example for describing the processes. However, another system, or combination of systems, may be used to perform the method 400.

In step 402, an identifier of a first user that accesses an electronic document is received. For example, a first user can access a web page using a browser. The web page can include a portion to be filled with advertising or other content (e.g., the web page may include GOOGLE's ADSENSE technology). When the web page is accessed by the browser, the browser can execute code within the web page that transmits an identifier for the first user along with a request for content to fill the portion.

In step 404, it is determined whether the first user is a friend of a second user that published content for display to friends. For example, the first user's identifier can be compared to a list of identifiers that have been marked as friends of content publishers. If the first user's identifier is included in the list, the corresponding content publisher can also be identified using the list. If the first user is a friend of the second user, or content publisher, the method 400 can perform optional step 408. If the first user's identifier is not included in the list of friends, the method 400 can proceed to optional step 406.

In optional step 406, alternative content can be displayed with the electronic document accessed by the first user. For example, instead of displaying the content published by the second user, the external server 202 can display advertisements to the first user on the web page accessed by the first user's browser. After this, the method 400 can end.

If the first user is identified as a friend of the second user that uploaded the content, it can be determined whether the first user meets additional filter criteria specified by the second user, as indicated in optional step 408. For example, a content publisher can specify a type of acquaintance or friend that the content publisher wishes to receive the content. The content server can compare information such as demographic information for the first user to the filter criteria selected by the content publisher to determine whether the first user meets the additional filter criteria. If the first user does not meet the additional filter criteria, the method 400 can proceed to optional step 406 as previously described. If the first user meets the additional filter criteria, the method 400 can proceed to optional step 410.

In step 410, it is determined whether the electronic document accessed by the friend has content related to the content uploaded by the second user. For example, if the published content is for a walk-a-thon charity event, the content publisher may have associated the content with keywords such as "exercise," "charity," "compassionate conservative," and "Christian." Keywords associated with the web page accessed by the first user can be determined as described in association with the keyword/web page index 226 of FIG. 2. If the keywords associated with the accessed web page do not correspond to the keywords associated with the content, the method 400 can proceed to optional step 406. If the keywords do correspond, step 412 can be performed.

In step 412, content from the second user can be displayed with the electronic document accessed by the first user. For example, an announcement for a charity event uploaded by the second user can be displayed on the web page accessed by the first user.

Figure 5:
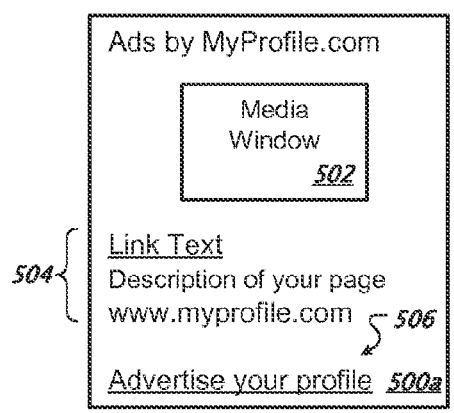
FIG. 5 shows example user interfaces 500a-c for creating an advertisement or an announcement to be presented to a user's friends.
Figure 5:
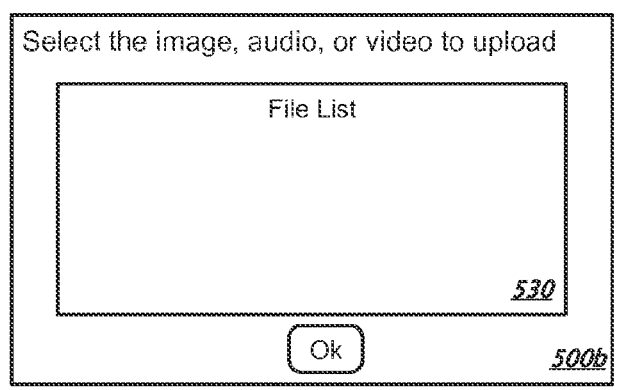
Figure 5:
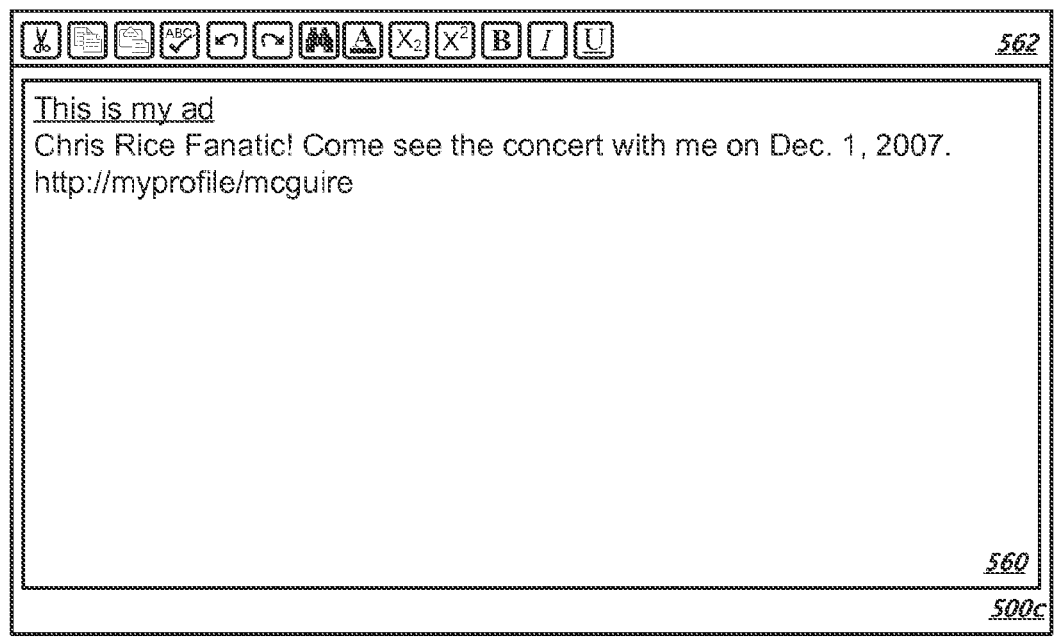

FIG. 5 shows example user interfaces 500a-c for creating an advertisement or an announcement to be presented to a user's friends. The interface 500a is a representation of a personal ad. The interface 500a includes a media window 502, a description text 504, and an advertise control 506. The media window 502 presents media, such as an image, audio, or video, to a user viewing and/or listening to the ad. The description text 504 contains the text body of the ad that describes, in this case, a personal web page being advertised. A user viewing the ad may select the advertise control 506 to initiate the creation his or her own personal ad.

The interface 500b allows an advertiser (i.e., content publisher) to select a file to be uploaded from a file list 530. The file may be media such as an image, audio, or video. The file list 530 may contain controls that allow the advertiser to navigate to a location where a particular file associated with the personal web page to be advertised resides. Selecting a file in the file list 530 may initiate the interface 500c or another control may initiate the interface 500c.

The interface 500c is an editor for the text description of the personal ad. The interface 500c includes a text entry area 560 and a text formatting controls 562. An advertiser may make inputs to the text entry area 560 containing the description of the personal ad. The advertiser may format the description, such as with underlining, boldface, color, font, or font size, using the text formatting controls 562.

Figure 6:
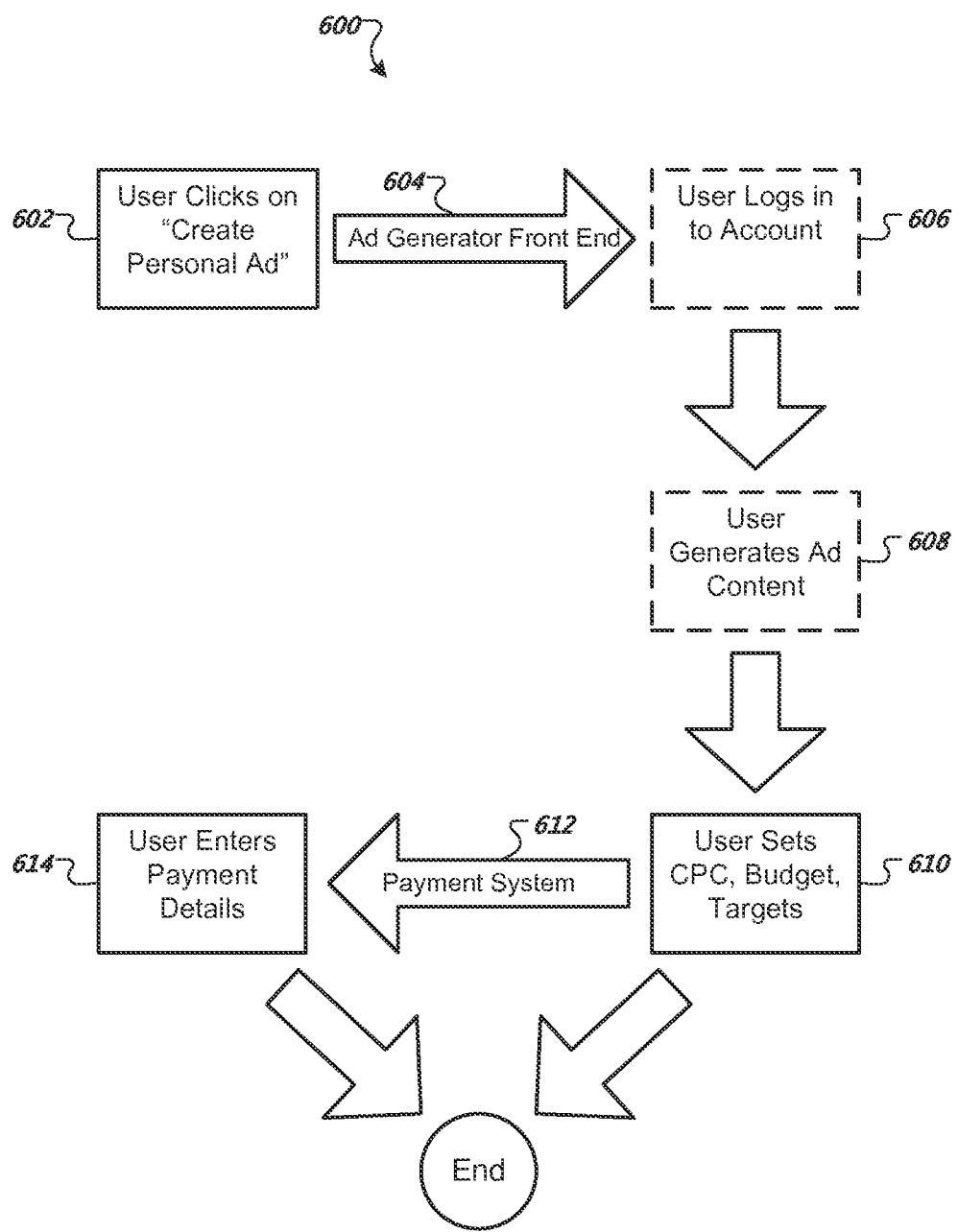
FIG. 6 is a flow chart of an example method 600 for creating an advertisement or announcement to be presented to a user's friends.

FIG. 6 is a flow chart of an example method 600 for creating an advertisement or announcement to be presented to a user's friends. Method 600 begins with a user clicking (602) on "Create Personal Ad." For example, a user may click on the advertise control 506 in the personal ad interface 500a. Selecting the advertise control 506 initiates an ad generator front end 604. The ad generator front end 604 guides the user through the personal ad creation method.

Optionally, method 600 receives (606) a user login to an account. For example, the personal ad creation/modification method may be password protected to prevent unauthorized changes from being made to personal ads.

Optionally, method 600 receives (608) a user generated ad. For example, a user may create a personal ad using the interfaces 500a-c. Alternatively, personal ads may be automatically generated by method 600 using, for example, content from a user's personal web page.

Process 600 receives (610) a user-specified cost-per-click, budget, and targets. For example, the user may specify how much the user intends to pay for each action resulting from the personal ad, such as an action of navigating to the user's personal web page via the personal ad or performing an action at the personal web page.

Payments may be triggered by various events, such as cost/pay-per-impression, cost/pay-per-click, and cost/pay-per action or acquisition (where action/acquisition may include, for example, adding the user as a friend). Payments made by the advertiser based on the cost-per-click (or other method) may be credited to an entity providing the ad server 718 functionality, an entity responsible for the personal web page where the personal ad is presented, an entity hosting the personal web page where the personal ad is presented (e.g., the social network 706), or some combination of these entities.

A payment system 612 tracks the number of times the advertiser's personal web page (or other web page) is accessed via the personal ad. The budget indicates a limit to the number of times the personal ad may be presented and selected. The user can optionally specify types of acquaintances to target as previously described or the system can default to select all acquaintances.

Process 600 receives (614) user payment details. For example, the advertiser user may input credit card information or PayPal information to make the payments based on the selected cost-per-click amount.

Figure 7:
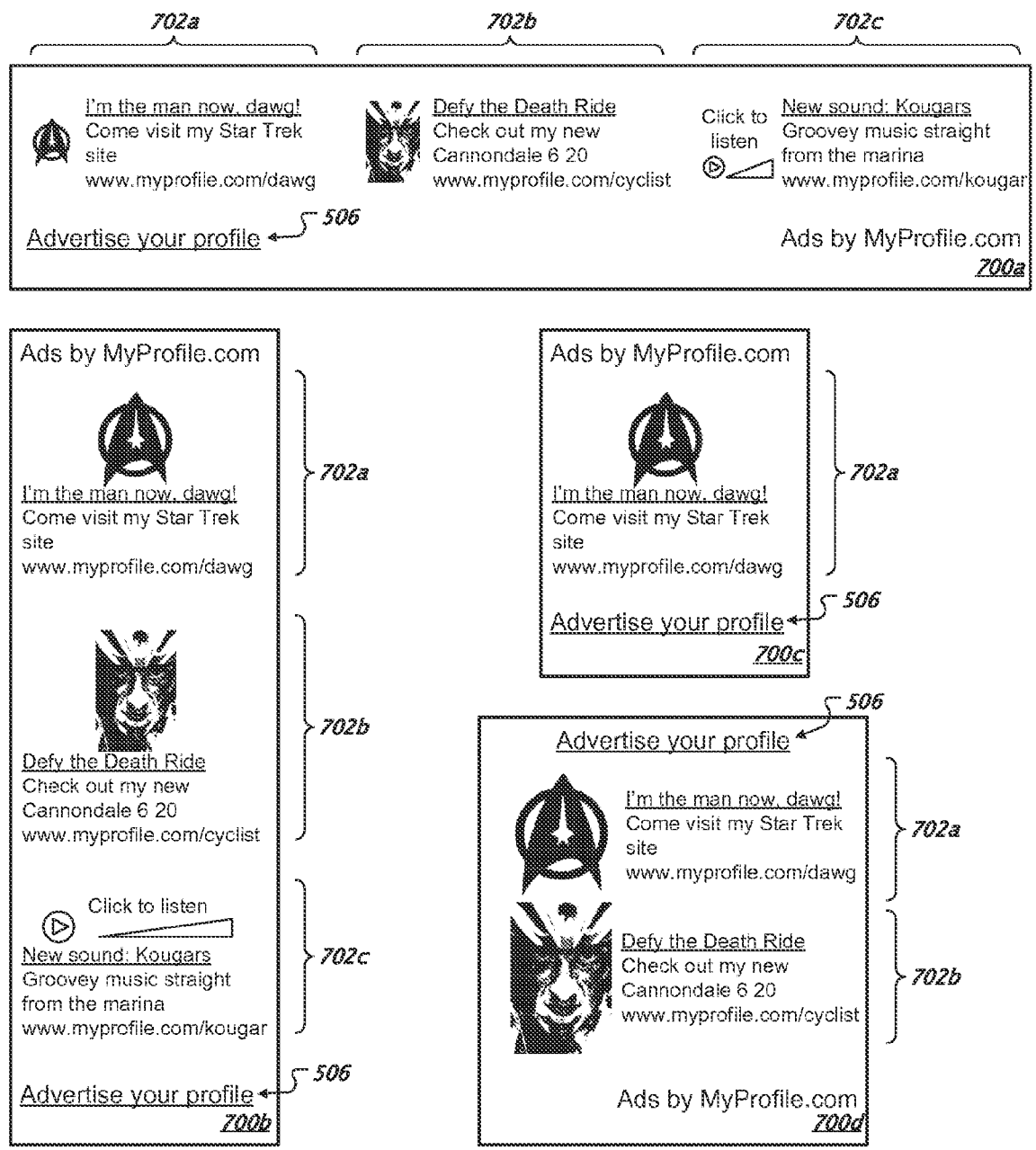
FIG. 7 shows example user interfaces 700a-d for presenting advertisements or announcements published by a user to the user's friends.

FIG. 7 shows example user interfaces 700a-d for presenting advertisements or announcements published by a user to the user's friends. The interfaces 700a-d include the advertise control 506. The interface 700a presents the personal ads 702a-c in a horizontal or banner orientation. As indicated by FIG. 7, a single user can be a friend of multiple content publishers. In this situation, the user could see multiple ads and/or announcements from various content publishers of which the user is an acquaintance. The interface 700b presents the personal ads 702a-c in a vertical or sidebar orientation. In another example, a single personal ad may be shown, such as the personal ad 702a in the interface 700c, or two personal ads may be shown, such as the personal ads 702a-b in the interface 700d.

Figure 8:
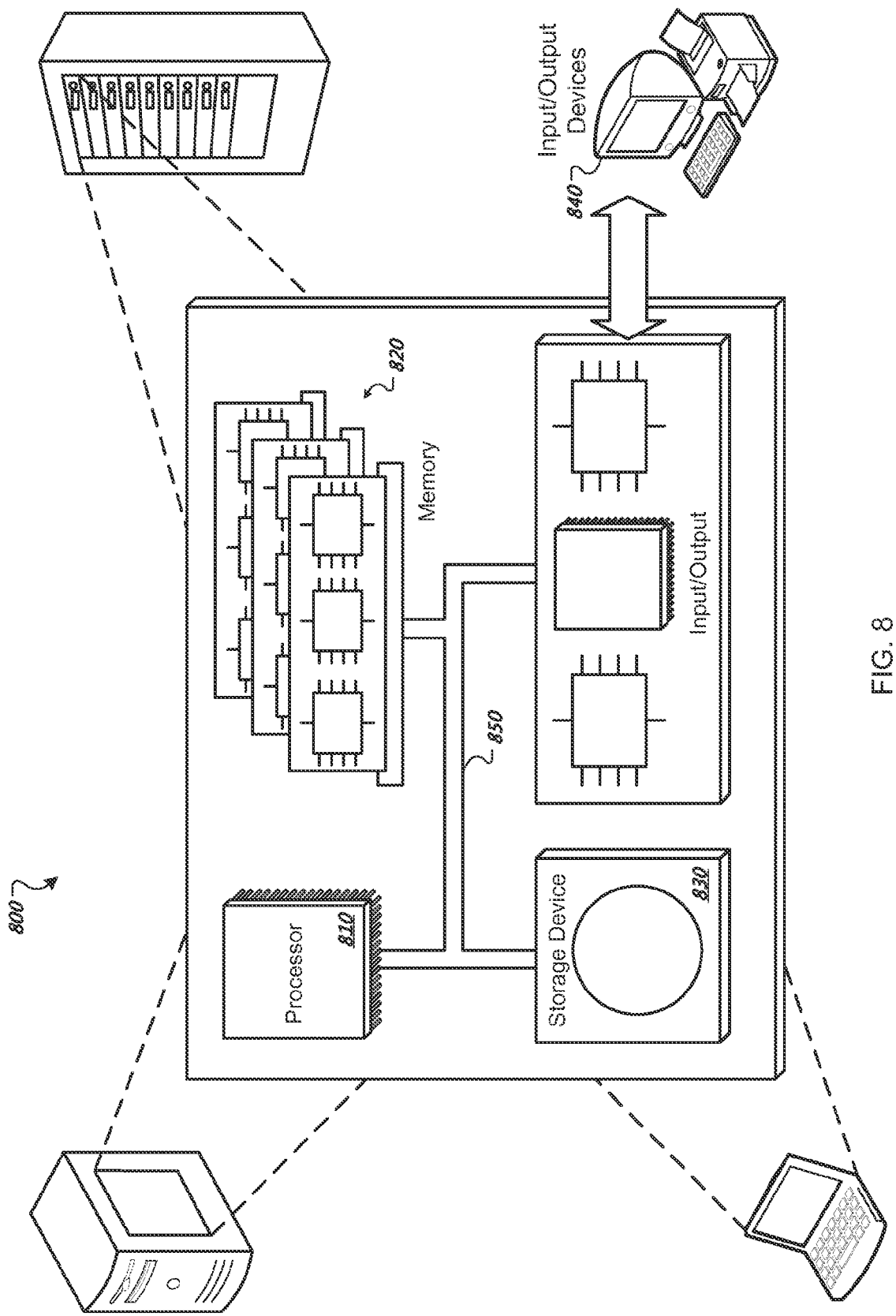
FIG. 8 is a schematic diagram of a computer system 800.

FIG. 8 is a schematic diagram of a computer system 800. The system 800 can be used for the operations described in association with any of the computer-implement methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, interactions between users may only produce relationships if a predetermined threshold is met. For example, the social graph generator may link a first user to a second user if the first user visited the second user's profile over ten times within a month. The social graph generator, however, may not link the first and second users if the first user only visited the second user's profile twice.

Additionally, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   accessing a social graph that represents members of a group of computer users, wherein the social graph represents social relationships between members of the group of computer users and describes types of acquaintance relationship between members of the group of computer users, wherein at least some of the types of acquaintance relationships in the social graph are automatically determined by a computer system using data that represents instances of electronic correspondence between two or more members of the group of computer users;
   receiving, at the computer system and from a first computing device that is associated with a first user who is a member of the group of computer users, a request to distribute content to other members of the group of computer users;
   receiving from the first computing device, an indication that the first user of the first computing device has selected, from among multiple provided types of acquaintances, a particular specified type of acquaintance with which the content is to be distributed;
   identifying, from among the group of computer users and using the social graph, one or more second users who have one or more acquaintance relationships, of the specified type, with the first user, wherein at least some of the types of acquaintance relationships in the social graph are automatically determined by the computer system using data that represents instances of electronic correspondence between two or more members of the group of computer users;
   determining that a second computing device corresponds to one of the second users and that the one of the second users has at least an acquaintance relationship of the specified type with the first user; and
   based on the determination that the second computing device corresponds to the one of the second users and that the one of the one of the second users has at least an acquaintance relationship of the specified type with the first user, transmitting the content submitted by the first user to the one of the second users for display to the one of the second users.

2. The method of claim 1, wherein determining that the one of the second users has at least an acquaintance relationship of the specified type with the first user comprises determining that the first user has shared an electronic correspondence with the one of the second users.

3. The method of claim 1, the method further comprising:
   receiving, from the first computing device, budget information for the request to distribute content;
   determining, from the budget information, a number of times to distribute the content; and
   determining that the content has not been distributed the number of times.

4. The method of claim 1, the method further comprising:
   determining that the second user has selected the content; and
   responsive to determining that the second user has selected the content, transmitting information associated with remuneration for the first user.

5. The method of claim 1, the method further comprising:
   accessing the data that represents instances of electronic correspondence between two or more members of the group of computer users; and
   generating the social graph by generating a node for each of the members of the group of computer users and generating, based on the data that represents instances of electronic correspondence between two or more members of the group of computer users, edges that describe types of acquaintance relationship between members of the group of computer users.

6. The method of claim 5, wherein generating the social graph further comprises:
   accessing data of a social network; and
   generating, based on the data that represents instances of electronic correspondence between two or more members of the group of computer users and based on the data of the social network, the edges.

7. The method of claim 6, wherein generating the edges further comprises identifying data of the social network that is associated with a particular user and identifying data that represents instances of electronic correspondence between the particular user and one or more other members of the group of computer users.

8. A system comprising:
   a server system comprising a computer processor and memory configured to:
   access a social graph that represents members of a group of computer users, wherein the social graph represents social relationships between members of the group of computer users and describes types of acquaintance relationship between members of the group of computer users, wherein at least some of the types of acquaintance relationships in the social graph are automatically determined by a computer system using data that represents instances of electronic correspondence between two or more members of the group of computer users;
   receive, from a first computing device that is associated with a first user who is a member of the group of computer users, a request to distribute content to other members of the group of computer users;

receive, from the first computing device, an indication that the first user of the first computing device has selected, from among multiple provided types of acquaintances, a particular specified type of acquaintance with which the content is to be distributed;

identify, from among the group of computer users and using the social graph, one or more second users who have one or more acquaintance relationships, of the specified type, with the first user, wherein at least some of the types of acquaintance relationships in the social graph are automatically determined by the computer system using data that represents instances of electronic correspondence between two or more members of the group of computer users;

determine that a second computing device corresponds to one of the second users and that the one of the second users has at least an acquaintance relationship of the specified type with the first user; and based on the determination that the second computing device corresponds to the one of the second users and that the one of the one of the second users has at least an acquaintance relationship of the specified type with the first user, transmit the content submitted by the first user to the one of the second users for display to the one of the second users; and the first computing device; and the second computing device.

9. The system of claim 8, wherein determining that the one of the second users has at least an acquaintance relationship of the specified type with the first user comprises determining that the first user has shared an electronic correspondence with the one of the second users.

10. The system of claim 8, wherein the server system is further configured to:

receive, from the first computing device, budget information for the request to distribute content;

determine, from the budget information, a number of times to distribute the content; and determine that the content has not been distributed the number of times.

11. The system of claim 8, wherein the server system is further configured to:

determine that the second user has selected the content; and responsive to determining that the second user has selected the content, transmit information associated with remuneration for the first user.

12. The system of claim 8, wherein the server system is further configured to:

access the data that represents instances of electronic correspondence between two or more members of the group of computer users; and generate the social graph by generating a node for each of the members of the group of computer users and generating, based on the data that represents instances of electronic correspondence between two or more members of the group of computer users, edges that describe types of acquaintance relationship between members of the group of computer users.

13. The system of claim 12, wherein to generate the social graph, the server system is further configured to:

access data of a social network; and generate, based on the data that represents instances of electronic correspondence between two or more members of the group of computer users and based on the data of the social network, the edges.

14. The system of claim 13, wherein to generate the edges, the server system is further configured to identify data of the social network that is associated with a particular user and identifying data that represents instances of electronic correspondence between the particular user and one or more other members of the group of computer users.

15. A system comprising:

means for creating a social graph that represents members of a group of computer users, wherein the social graph represents social relationships between members of the group of computer users and describes types of acquaintance relationship between members of the group of computer users, wherein at least some of the types of acquaintance relationships in the social graph are automatically determined by a computer system using data that represents instances of electronic correspondence between two or more members of the group of computer users;

a server system comprising a computer processor and memory configured to:

access the social graph;

receive, from a first computing device that is associated with a first user who is a member of the group of computer users, a request to distribute content to other members of the group of computer users;

receive, from the first computing device, an indication that the first user of the first computing device has selected, from among multiple provided types of acquaintances, a particular specified type of acquaintance with which the content is to be distributed;

identify, from among the group of computer users and using the social graph, one or more second users who have one or more acquaintance relationships, of the specified type, with the first user, wherein at least some of the types of acquaintance relationships in the social graph are automatically determined by the computer system using data that represents instances of electronic correspondence between two or more members of the group of computer users;

determine that a second computing device corresponds to one of the second users and that the one of the second users has at least an acquaintance relationship of the specified type with the first user; and based on the determination that the second computing device corresponds to the one of the second users and that the one of the one of the second users has at least an acquaintance relationship of the specified type with the first user, transmit the content submitted by the first user to the one of the second users for display to the one of the second users; and the first computing device; and the second computing device.

16. The system of claim 15, wherein determining that the one of the second users has at least an acquaintance relationship of the specified type with the first user comprises determining that the first user has shared an electronic correspondence with the one of the second users.

17. The system of claim 15, wherein the server system is further configured to:

receive, from the first computing device, budget information for the request to distribute content;

determine, from the budget information, a number of times to distribute the content; and determine that the content has not been distributed the number of times.

18. The system of claim 15, wherein the server system is further configured to:
- determine that the second user has selected the content; and
- responsive to determining that the second user has selected the content, transmit information associated with remuneration for the first user.

19. The system of claim 15, wherein creating the social graph further comprises:
- accessing the data that represents instances of electronic correspondence between two or more members of the group of computer users; and
- generate the social graph by generating a node for each of the members of the group of computer users and generating, based on the data that represents instances of electronic correspondence between two or more members of the group of computer users, edges that describe types of acquaintance relationship between members of the group of computer users.

20. The system of claim 19, wherein generating the social graph further comprises:
- access data of a social network; and
- generate, based on the data that represents instances of electronic correspondence between two or more members of the group of computer users and based on the data of the social network, the edges.

21. The system of claim 20, wherein generating the edges further comprises identifying data of the social network that is associated with a particular user and identifying data that represents instances of electronic correspondence between the particular user and one or more other members of the group of computer users.

* * * * *